(12) United States Patent
Miyazaki

(10) Patent No.: US 6,983,006 B2
(45) Date of Patent: Jan. 3, 2006

(54) ALL-ELECTRIC GLASS-MELTING DEEP FURNACE AND METHOD OF REFINING AND SUPPLYING GLASS

(76) Inventor: Motoaki Miyazaki, 275-4, Irie, Maihara-cho, Sakata-gun, Shiga 521-0003 (JP)

( * ) Notice: Subject to any disclaimer, the term of this patent is extended or adjusted under 35 U.S.C. 154(b) by 29 days.

(21) Appl. No.: 10/814,980

(22) Filed: Mar. 31, 2004

(65) Prior Publication Data

US 2004/0196886 A1    Oct. 7, 2004

(30) Foreign Application Priority Data

Apr. 1, 2003    (JP) ............................. 2003-097624

(51) Int. Cl.
   *C03B 5/027*    (2006.01)

(52) U.S. Cl. .............................. 373/29; 373/30; 373/39

(58) Field of Classification Search ............ 373/27–41; 65/135.8, 339–346
See application file for complete search history.

(56) References Cited

U.S. PATENT DOCUMENTS 4,143,232 A  *  3/1979  Bansal et al. .................. 373/41

FOREIGN PATENT DOCUMENTS

| JP | 54-22424 | 2/1979 |
|---|---|---|
| JP | 58-32030 | 2/1983 |

* cited by examiner

*Primary Examiner*—Tu Hoang
(74) *Attorney, Agent, or Firm*—Milde & Hoffberg, LLP

(57) ABSTRACT

An all-electric glass-melting deep furnace and a method of refining and supplying glass are disclosed in which high-quality molten glass is efficiently produced in large quantity at high heat efficiency. The glass-melting deep furnace 20 has a bottom 2 and a side wall 4 constructed by piling up fireproof bricks 3 on the perimeter of the bottom 2. A height H of the side wall 4 is set to be twice or more than twice as long as an inside dimension D of the bottom 2 of the furnace. Since the furnace 20 is deep, there can be achieved a thick batch layer, a space in which glass is melted at high temperature, and a cooling area which is necessary to refine molten glass. The furnace makes it possible for the molten glass 6 to absorb fine seeds by its pressure and cooling effects that are produced when the seeds move downward to the bottom 2.

10 Claims, 7 Drawing Sheets

Section taken on line X—X

H/D ≥ 2

FIG. 7 (a)
FIG. 7 (b)
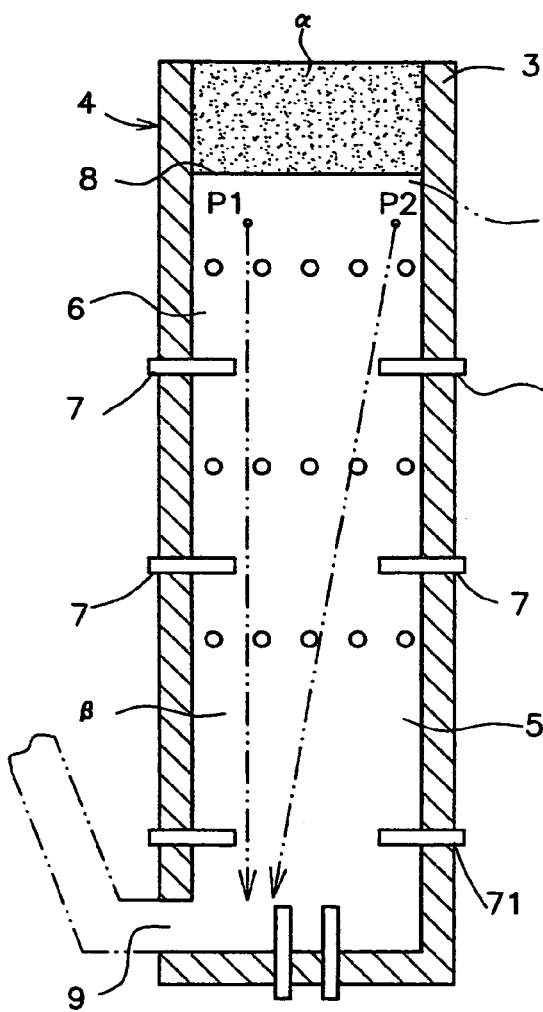
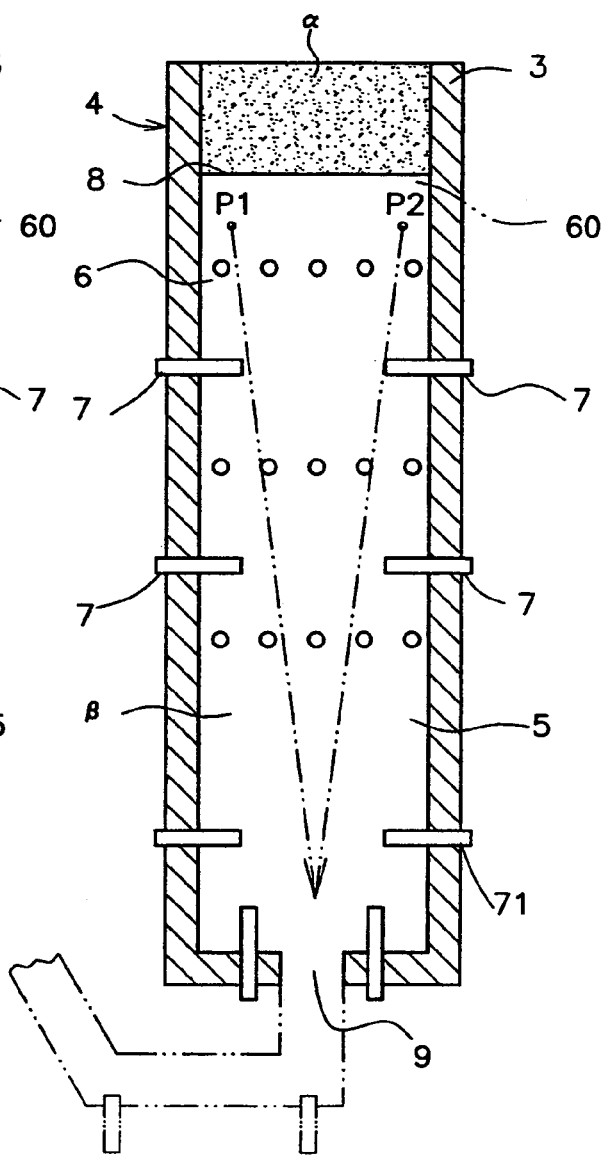

ALL-ELECTRIC GLASS-MELTING DEEP FURNACE AND METHOD OF REFINING AND SUPPLYING GLASS

BACKGROUND OF THE INVENTION

1. Field of the Invention

The present invention relates to an all-electric glass-melting deep furnace for producing glass and to a method of refining and supplying glass.

2. Description of Related Art

A conventional glass furnace consists of a bottom of fireproof bricks and a side wall constructed by piling up fireproof bricks on the perimeter of the bottom. A known furnace of this type is a side-port type tank furnace which is an open-hearth furnace for heating glass material charged into the furnace to a predetermined temperature by fuel oil burners, gas burners, or heat sources such as electrodes built in the furnace.

A conventional glass furnace is shallow or is designed with no thought given to the depth. Therefore, as production volume (flow volume) of molten glass increases, more seeds (small bubbles) are contained in the molten glass, which causes a problem.

For example, when a transparent product such as a plate glass is continuously produced, molten glass flows out through a hole formed in the bottom and is fed to a making machine through a refiner. At the same time, the same volume of glass raw materials as that of the molten glass flowing out through the hole is continuously charged into the furnace from the top thereof so that the volume of the molten glass in the furnace can be kept constant. The glass raw materials charged into the furnace are not melted at once but it is piled up on the surface of the molten glass, thus making a batch of glass (layer). In the open-hearth furnace, the batch of glass is subjected to a strong heat radiation caused by the burning of fuel oil or gas from the above. The molten glass is not fully covered with a batch of glass, but is widely exposed. Such exposed portion of the molten glass is designated as "mirror".

In the furnace filled with a predetermined amount of molten glass, a burner is provided above the glass raw materials and a plurality of pairs of heating electrodes are supplementally provided as heat sources to the side wall or bottom of the furnace in such a manner that the heating electrodes are placed at lower positions than the surface level of the molten glass. An energy for melting the glass raw materials is supplied by main heating with fuel oil burner or gas burner placed above the glass raw materials and by supplemental heating with the heating electrodes. Therefore, when the fuel oil burner or gas burner is ignited and an electric current is passed through the electrodes, the glass raw materials are heated from above and underneath by the electrodes. An example of convection generated by such heating is as follows. Specifically, the molten glass near the heating electrodes is heated first and moves upward until it reaches right below the batch. Then, it flows horizontally to some extent and moves downward towards the bottom as a downward flow. When the batch touches such convection layer between the heating electrodes and the batch, it is heated and gradually melted.

The aforementioned molten glass is attracted by the molten glass flowing out from the throat (hole) formed in the bottom of the furnace and moves downward towards the bottom that is placed at a lower position than the heating electrodes while lowering the temperature. In the furnace, the molten glass near the batch is particularly referred to as a seed-containing layer. The molten glass immediately after being melted contains seeds composed mainly of carbon dioxide. However, these seeds are removed when the molten glass flows towards the throat or when it is in a refiner. The term "remove" used herein means that the seeds go upward in the molten glass and is released from the surface of the molten glass and that the seeds are removed (namely, the molten glass is refined) by being absorbed into the molten glass in the course of lowering the temperature.

Such techniques are disclosed in the Japanese Unexamined Patent Publication No. (Patent Kokai No.) 54-22424 (1979) and Japanese Unexamined Patent Publication No. (Patent Kokai No.) 58-32030 (1983).

In a conventional furnace, improvement of heat efficiency is hindered by the following factors. For this reason, when an emission problem of carbon dioxide and exhaustion of fossil fuel become more and more serious in the future, significantly high consumption of energy such as electric power or fuel to be provided to the heat sources is seen as a problem.

The body of the furnace is generally s like a box. If the inside dimension of the furnace is set to be large, the heat escaping upward in the furnace is significantly increased. Therefore, unnecessary heat must be provided into the furnace through the aforementioned heat source.

Further, if the inside dimension of the furnace is set to be large, a batch of glass becomes thin so that this causes too much cooling of the surface of the molten glass. As this result, it is shown by experience that the molten glass containing a lot of seeds highly tends to flow downward and the seeds go into the refiner. This is considered to be because since the flow rate increases when the surface of the molten glass is quickly cooled, there is not sufficient time to completely remove the seeds and therefore a tiny amount of seed-containing molten glass flows to the bottom of the furnace.

Further, since a batch of glass itself acts as a heat insulating material for preventing heat radiation from the surface of the molten glass, a thick batch of glass can, to some extent, prevent the presence of seeds in the refiner. However, it is technically difficult to keep the thickness of the batch constant because the batch is gradually melted as time goes by. Particularly, where the inside dimension of the furnace is large, it is necessary to melt the batch completely in the furnace and to produce a wide range of mirror portion containing fewer seeds.

Accordingly, as disclosed in the aforementioned patent publication No. 54-22424 (1979), it is tried to make the diameter of an opening of the top portion shorter than the inside dimension of the bottom of the furnace by forming a step or a narrow portion on or in the body of the furnace using an all-electric melting technique. This can reduce the amount of heat escaping upward in the furnace. However, since such step or narrow portion increases the surface area of the furnace, a desired heat efficiency cannot always be attained. Further, such problem arises that when the bricks corresponding to the step or narrow portion are exposed to high temperature, they are broken into stone pieces (stones) and mixed into the molten glass.

Alternatively, if the whole furnace is downsized, the surface area thereof can be reduced. However, since the volume of refining area is reduced, the amount of high-quality molten glass obtained at a time is decreased.

Accordingly, objects of the present invention are to provide an all-electric glass-melting deep furnace in which high-quality molten glass can be efficiently produced at high heat efficiency and to provide a method of refining and supplying glass.

SUMMARY OF THE INVENTION

An all-electric glass-melting deep furnace according to the present invention has a bottom and a side wall constructed by piling up fireproof bricks on the perimeter of the bottom. Further, heating electrodes to be described later jut from an inner surface of the side wall and pass a current through the molten glass filled inside the side wall. A height of the side wall is set to be twice or more than twice as long as an inside dimension of the bottom, and distances from the respective heating electrodes to the bottom of the furnace are set to be as long as or longer than the inside dimension of the bottom.

The phrase "inside dimension" used herein means an inside diameter when the bottom of the furnace or a portion close to the bottom is circular in cross section. On the other hand, if the bottom of the furnace or the portion close to the bottom is rectangular or a polygonal in cross section, the inside dimension used herein means a diameter of a circle with an area (reduced value) equal to the sectional area of such rectangle or polygon.

Further, in the all-electric glass-melting deep furnace according to the present invention, the aforementioned side wall may extend upwardly from the perimeter of the bottom and may be trapezoidal or rectangular as viewed from the side.

Furthermore, auxiliary electrodes for heating the molten glass by generating smaller amount of heat than the aforementioned heating electrodes may be provided below the heating electrodes, respectively. Further, the aforementioned heating electrodes are placed on the side wall at different levels from the bottom of the furnace.

Further, depending on the depth of the furnace, a feeder for discharging the molten glass from the furnace may be provided at a lower position than a surface level of molten glass. Further, the molten glass may be discharged from the feeder through a throat portion formed in the center of the bottom of the furnace.

A method of refining and supplying glass according to the present invention comprises the steps of: charging glass raw materials into a furnace whose side wall's height is twice or more than twice as long as an inside dimension of a bottom of the furnace so as to thermally melt the glass raw materials; heating molten glass obtained by thermally melting the glass raw materials with heating electrodes that jut from the side wall so as to increase the temperature of the molten glass and that are placed at different levels from the bottom of the surface; charging further glass raw materials into the furnace so as to make a surface level of the molten glass twice or more than twice as high as the lowest level of heating electrodes among the group of electrodes; convecting the molten glass above the heating electrodes while the molten glass is being heated with the heating electrodes; and discharging the molten glass from the bottom of the furnace.

Further, in the course of moving down of the molten glass in the deep furnace, the molten glass may be discharged from the bottom of the furnace through a feeder that is provided at a lower position than the surface level of the molten glass.

In the all-electric glass-melting deep furnace and the method of refining and supplying glass according to the present invention, the height of the side wall is twice or more than twice as long as the inside dimension of the bottom of the furnace. Therefore, the opening at the top of the side wall can be freely formed without decreasing the volume of the molten glass in the furnace. This can effectively prevent the heat from escaping upward in the furnace. Furthermore, when the side wall extends upwardly and inclines inwardly and the furnace is substantially trapezoidal in shape viewed from the side, the opening at the top of the side wall can be further narrowed. In addition to this, since the surface area of the opening can be minimized, the furnace of the present invention can achieve a higher heat efficiency than a conventional furnace having a narrow portion or step.

Therefore, the emissions of the carbon dioxide is more dramatically decreased in the furnace of the present invention than in a conventional open-hearth furnace such as a side-port type tank furnace. In addition, when exhaustion of fossil fuel becomes more serious in the future, electric power can be effectively used to produce high-quality glass products.

Further, according to the all-electric glass-melting deep furnace and the method of refining and supplying glass of the present invention, the heating electrodes jut from the inner surface of the side wall and the distances between the heating electrodes and the bottom of the furnace are as long as or longer than the inside dimension of the bottom of the furnace. Therefore, the molten glass heated by the heating electrodes moves upwards right below the batch, then flows horizontally to some extent, and subsequently moves down towards the bottom. While the molten glass melted from the batch layer is moving down to the heating electrodes in the furnace, relatively big seeds composed mainly of carbon dioxide are removed from the molten glass and the area below the heating electrodes becomes the refining area. In the refining area, more gases are absorbed by pressure and cooling than in the conventional open-hearth furnace. Particularly, if the heating electrodes consist of a group of electrodes that are placed at various positions of the side wall, there can be produced a significant effect that a temperature distribution in the furnace can be adjusted to a desired distribution (high temperature at the top, low temperature at the bottom, and uniform temperature in the horizontal direction of the furnace).

Therefore, the present invention can contribute to a dramatic increase in the voltage of high-quality glass raw materials and to a mass-production of glass products. Further, since the height of the side wall is twice or more than twice as long as the inside dimension of the bottom of the furnace, the surface area of the batch layer of the present invention can be considerably smaller than that of a conventional invention and a uniform surface temperature distribution of the molten glass that touches the batch layer can be ensured. Accordingly, there is little difference between the conditions of the molten glasse melted from the batch layer. Even if the molten glass from which seeds are not sufficiently removed moves downward and reaches to the refining area, the temperature of such seeds decreases, pressure is applied to such seeds, and then such seeds are absorbed in the molten glass and disappears. In this way, the quality level of the glass products can be stably high.

According to the all-electric glass-melting deep furnace and the method of refining and supplying glass of the present invention, since auxiliary electrodes that generate smaller amount of heat are provided below the heating electrodes and a current is passed through the auxiliary electrodes as need arises, a good temperature distribution can be maintained in the furnace. Therefore, since the height of the side wall is set to be twice or more than twice as long as the inside dimension of the bottom of the furnace to achieve a deep refining area, the distance between the batch and the throat becomes longer, so that the molten glass is refined in the refining area before it reaches the throat. Thus, a large amount of high-quality molten glass is supplied from the throat.

Further, in the aforementioned deep furnace, a feeder is placed at a lower position than the surface of the molten glass, so that the molten glass in the feeder is circulated by pressure of the molten glass in the furnace. This slightly decreases the temperature of the molten glass and prevents the molten glass from being hardened in the feeder, and good circulation of the molten glass in the feeder can be achieved.

Further, as an industrial applicability, the all-electric glass-melting deep furnace and the method of refining and supplying glass according to the present invention are suitable for continuously producing transparent material such as a plate glass.

BRIEF DESCRIPTION OF THE DRAWINGS

FIG. 7(a) is a vertical sectional view for conceptually showing effects of the all-electric glass-melting deep furnace according to another embodiment of the present invention, and FIG. 7(b) is a vertical sectional view for showing effects of another variation of the furnace.

DESCRIPTION OF THE PREFERRED EMBODIMENTS

A main point of the present invention is that the furnace is deep. Such deep furnace makes it possible to produce and refine a large amount of molten glass. Viewed from the top, the furnace may be square, rectangular, or polygonal in shape. The furnace of a polygonal shape (when viewed from the top) is preferable for safety reasons because bricks are hard to fall in the furnace.

Figure 1:
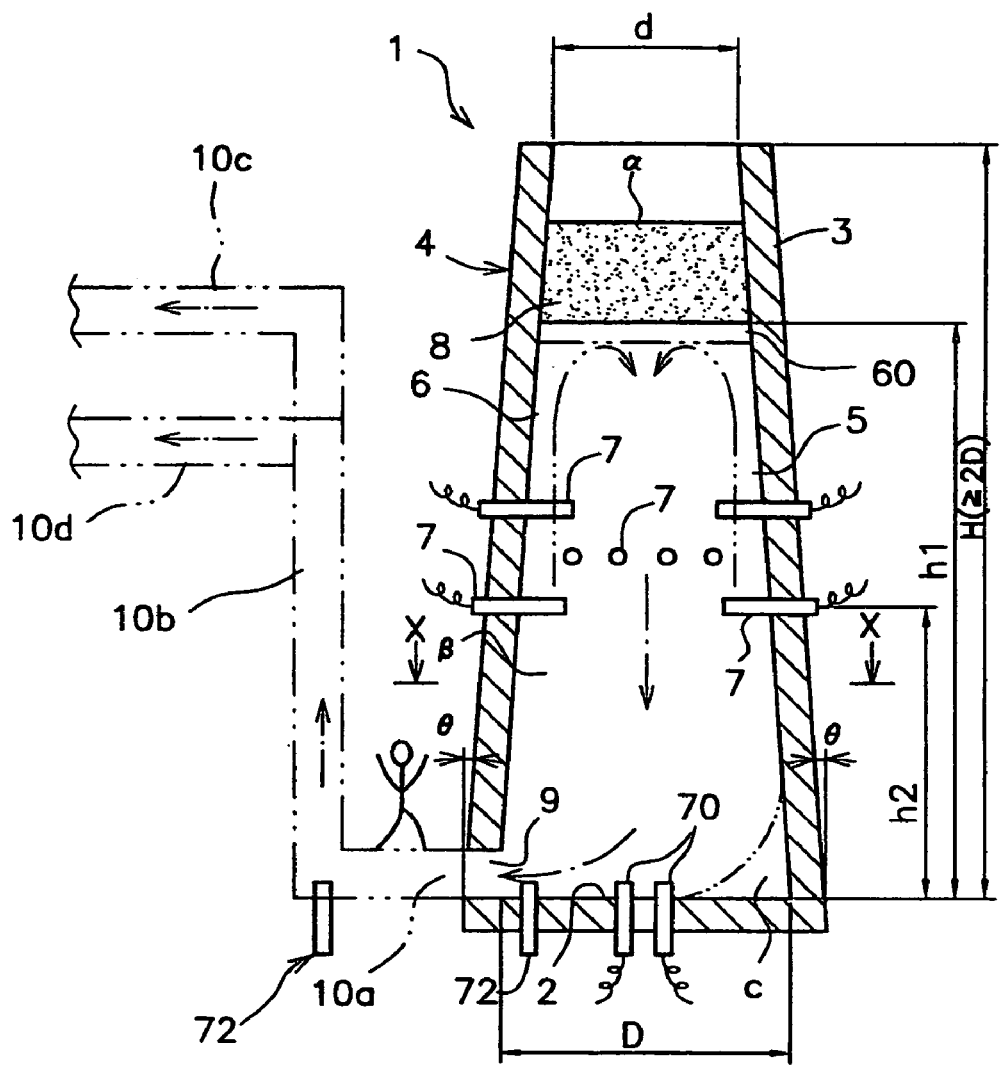
FIG. 1 is a schematic sectional view of an embodiment of an all-electric glass-melting deep furnace according to the present invention.
Figure 2:
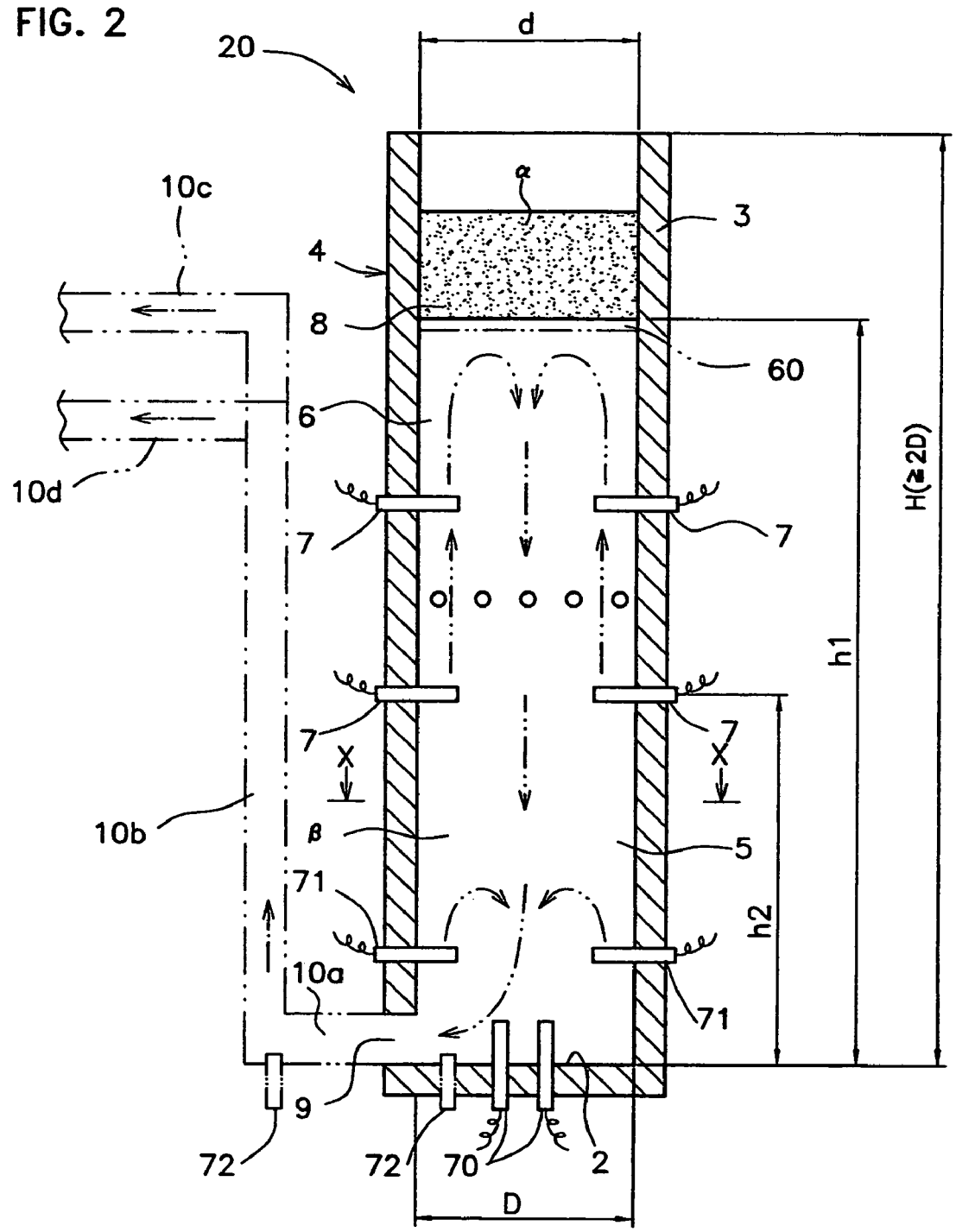
FIG. 2 is a schematic sectional view of another embodiment of the all-electric glass-melting deep furnace according to the present invention.
Figure 3F:
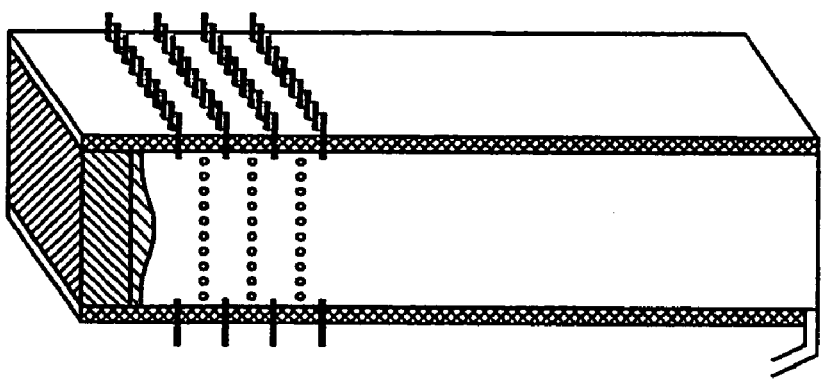
FIGS. 3(a) to 3(f) are side views showing various embodiments of the all-electric glass-melting deep furnace according to the present invention.
Figure 3E:
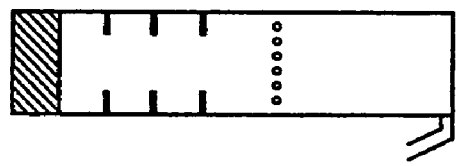
Figure 3D:
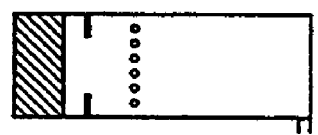
Figure 3C:
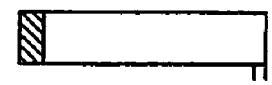
Figure 3B:
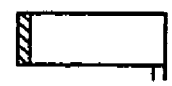
Figure 3A:
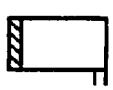
Figure 4:
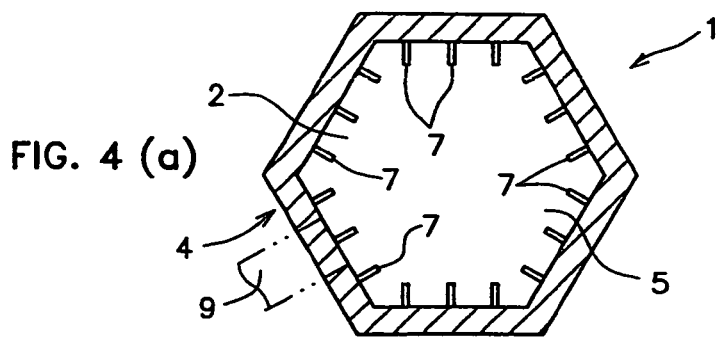
FIGS. 4(a) to 4(d) are horizontal sectional views taken on line X—X of FIG. 1 or FIG. 2.
Figure 4:
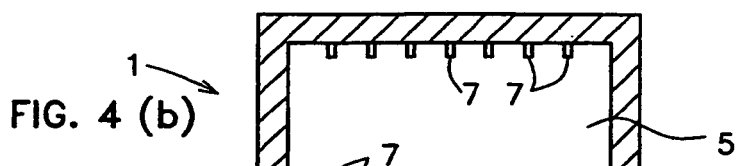
Figure 4:
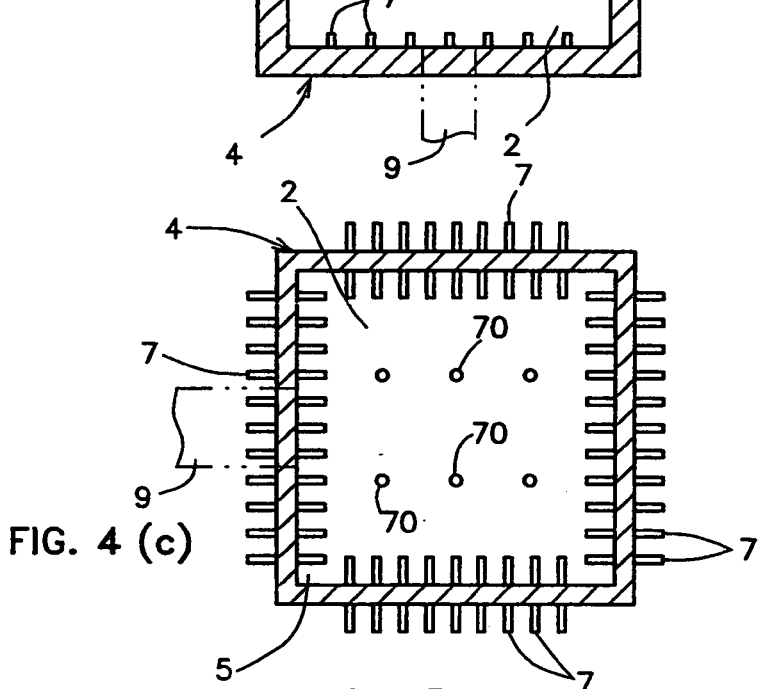
Figure 4:
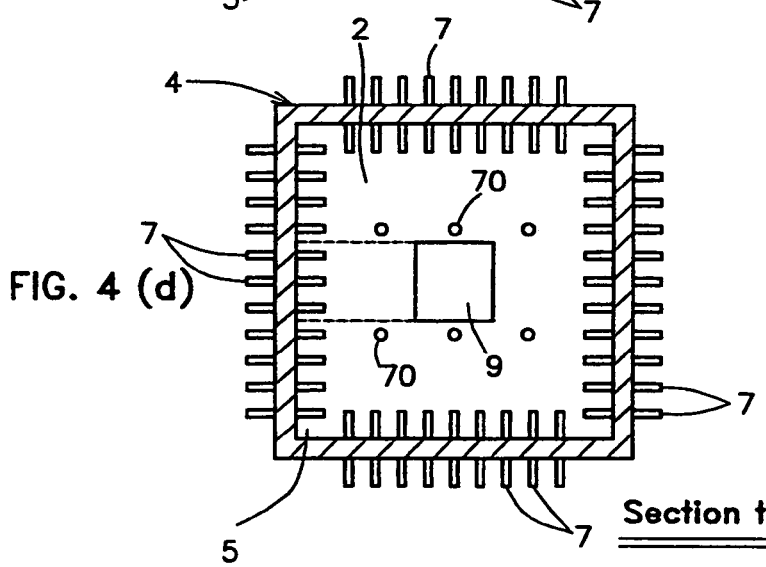

As shown in FIG. 1, an all-electric glass-melting deep furnace 1 according to the present invention has a bottom 2 and a side wall 4 constructed by piling up fireproof bricks 3 on a perimeter of the bottom 2. A height H of the side wall 4 is set to be twice or more than twice as high as an inside dimension D of the bottom 2 of the furnace (H≧2D). The side wall 4 extends upwardly from the perimeter of the bottom 2 of the furnace and inclines inwardly. Viewed from the side, the all-electric glass-melting deep furnace 20 is substantially trapezoidal in shape. As shown in FIG. 2, the side wall 4 may stand upright. In other words, viewed from the side, the all-electric glass-melting deep furnace 1 may be rectangular in shape.

For convenience of explanation, the all-electric glass-melting deep furnace 1 is shown out of scale in FIGS. 1 and 2. If the furnace has a square horizontal cross section, a relation between the inside dimension D of the bottom 2 of the furnace and the height H of the side wall 4 is as shown in FIGS. 3(a) to 3(f). FIGS. 3(a) to 3(f) show various shapes of the furnace in which the value of H/D (depth) are substantially, 2, 3, 5, 3, 4.5; and 5; respectively.

[EXAMPLE 1]

When the side wall 4 is inclined as described above, an inclination angle θ may be any degrees. In consideration of materials and productivity, the inclination angle is preferably within 5 degrees. This is because a desired heat efficiency can be achieved without significantly inclining the side wall 4. For example, when the height H of the side wall 4 is 7.0 m and the inside dimension D of the bottom 2 of the furnace is 2.5 m, if the inclination angle θ of the side wall 4 is set to 3.5 degrees, the diameter d of an opening at the top of the side wall 4 becomes d≈1.6 m. Thus, only by slightly inclining the side wall 4, the diameter d of the opening can be effectively reduced, and the heat can be prevented from escaping upward in the furnace. Furthermore, since an increase of the surface area of the side wall 4 that is caused by reducing the diameter d of the opening is minimized, the furnace of the present invention can achieve a higher heat efficiency than a conventional all-electric glass-melting furnace having a step or narrow portion.

Generally, mortar is used as a binder for fireproof bricks 3. However, since there is a possibility that mortar is crushed into pieces and mixed into the molten glass 6 filled in the furnace 5, it is not preferable to use mortar to bond together fireproof bricks (glass contact block) 3 that directly touch the molten glass 6. Therefore, where the inclination angle is 5 degrees or less, the fireproof bricks 3 can be supported by each other without using mortar and the periphery of the furnace is tightened by a flat bar or an angle.

The side wall 4 may be circular, elliptic, or oval in horizontal cross section. Preferably, the cross section taken on line X—X of FIG. 1 is shaped like hexagon, rectangle, square, or other quadrangle, as shown in FIGS. 4(a) to 4(d). Alternatively, Where the furnace is about 5 meter deeper (or about 5 meter higher), the cross section is preferably shaped like polygon having a multiple of three sides because three phase alternating current is used therein.

The molten glass 6 is heated constantly to a melting temperature or more by the heating electrodes 7 that pass an electric current through the molten glass 6. The heating electrodes 7 jut from the inner surface of the side wall 4, as shown in FIGS. 4(a) to 4(d), and are placed at different levels from the bottom of the furnace, as shown in FIGS. 1 and 2. Preferably, the heating electrodes 7 are placed at such levels as to reduce interaction between electric currents. For example, the distances between the respective electrodes are one meter or more. The distance h2 from the lowest level of heating electrodes 7 from the bottom 2 of the furnace is set to be as long as or more than as long as the inside dimension D of the bottom 2 of the furnace (h2≧D.)

To increase the distance between the lowest level of heating electrodes 7 and the surface 8 of the molten glass 6 with respect to the inside dimension D of the bottom 2 of the furnace resolves the deviation of the temperature distribution in a conventional open-hearth furnace in which the temperature just above the heating electrodes 7 especially increases. Since the distance between the lowest level of heating electrodes 7 and the bottom 2 of the furnace becomes long, more time can be spent in removing seeds from the molten glass 6 that moves down from the lowest level of heating electrodes 7 to the bottom 2 of the furnace.

Thus, the molten glass 6 moving down from the heating electrodes 7 to the bottom 2 of the furnace is not convected as described later, but calmly moved downward while the temperature is decreasing. This means that the convection is hard to occur between the heating electrodes 7 and the bottom 2 of the furnace and that the whole of the molten glass 6 between the heating electrodes 7 and the bottom 2 of the furnace moves downward Further, the thickness of a batch layer α and the melting temperature can be adjusted by placing a plurality of heating electrodes 7 at a plurality of levels. Furthermore, while the molten glass 6 heated with the lowest level of heating electrodes 7 is moved upward (or convected), the molten glass 6 can be continuously heated.

The number of levels of the heating electrodes 7 is preferably two to five depending on the productivity of a glass product and a kind of glass. Also, the heating electrodes 7 may be arranged on six or more levels. Alternatively, one or more levels of additional heating electrodes 7 may be provided under the lowest level of heating electrodes 7. In other words, one or more levels of heating electrodes 7 may be provided in a refining layer β to be described later. The arrangement and the number of the electrodes and the number of levels are determined in consideration of the temperature distribution in the furnace, productivity of a glass product, kind of glass, the depth of the furnace, and the like.

As shown in FIG. 1, when three levels of heating electrodes 7 are provided, an amount of heat generated by each level of electrodes 7 per hour may be different. For example, the ratio among the amount of heat generated by the top level, the amount of heat generated by the middle level, and the amount of heat generated by the bottom level of the electrodes 7 may be set to 1;3:2 or 1;1:4. The amount of heat to be generated may be adjusted by increasing or decreasing a voltage to be applied between the electrodes. Alternatively, the aforementioned ratio may be determined on the basis of a selection of which level of heating electrodes 7 generates the largest amount of heat.

FIG. 1 or 2 shows that the distance $h2$ of the lowest level of heating electrodes 7 is set to be as long as or more than as long as the inside dimension D of the bottom 2 of the furnace ($h2 \geq D$), and that when the molten glass is properly filled in the furnace 5, the distance $h2$ is half as long as or more than half as long as the height $h1$ of the surface 8 of the molten glass 6 ($h2 \geq h1/2$). The heating electrodes 7 are placed on such a position so as to extend the distance between the heating electrodes 7 and the surface 8 of the molten glass 6. The reasons for this are as follows.

As described above, when an electric current is passed trough the plurality of levels of heating electrodes 7, the molten glass 6 near the heating electrodes 7 is heated first and rises to the surface 8. By setting the rising distance to be relatively long, a rising speed of the molten glass 6 slows down and the molten glass 6 can be prevented from gathering just above the heating electrodes 7. In addition, the temperature of the surface 8 of the molten glass 6 can be kept constant and the batch layer α formed on the surface 8 of the molten glass 6 can be uniformly melted.

After the molten glass 6 rises just below the batch layer α by being heated with the plurality of levels of the heating electrodes 7, it flows in the horizontal direction and then moves downward in the furnace 5. Following this, molten glass 60 is melted uniformly from the batch layer α and moves downward to the level $h2$ of the heating electrode 7. In this process, seeds composed mainly of carbon dioxide are removed from the molten glass 6.

Therefore, since an area between the bottom 2 of the furnace and the level $h2$ in the furnace 5 becomes a refining layer β, a volume of high-quality molten glass that can be sucked through the throat (throttle) portion 9 formed in the bottom of the furnace can be increased.

The molten glass sucked through the throat portion 9 is passed through the inside 10a of the throat portion and a riser 10b (rising path) and then reaches an open feeder 10c (feeding path) that is substantially as high as the height $h1$ of the surface 8 and that extends horizontally. Although the rest from the open feeder 10c is not shown in the drawing, the molten glass 6 is sucked by a suction apparatus and then fed to a machine for making a plate glass and the like.

Generally, the open feeder 10c is provided substantially as high as the surface 8 of the molten glass 6. However, if the refining portion (an area of the refining layer β) is very deep, a cord feeder 10d is provided in a position lower than the surface 8 of the molten glass 6, instead of the open feeder 10c. In the covered feeder 10d, the circulation of molten glass 6 is induced by pressure of the molten glass 6 in the furnace 5. In this case, a covered feeder 10d is used. The covered feeder 10d prevents a temperature drop of the molten glass 6 that leads to hardening of the molten glass 6, and can produce an effect of forcibly maintaining an excellent flow of the molten glass 6 in the furnace 5. In the furnace 5 having a deep refining portion, the covered feeder 10d is particularly useful for maintaining an excellent flow of easily-hardened glass, high-volatile glass such as borosilicate glass, or color glass that tends to be hardened when it is discharged from the furnace 5 with a deep refining portion. The present invention is also used for such furnace as shown in FIG. 5(c) in which the molten glass 6 is discharged from the bottom.

Figure 5:
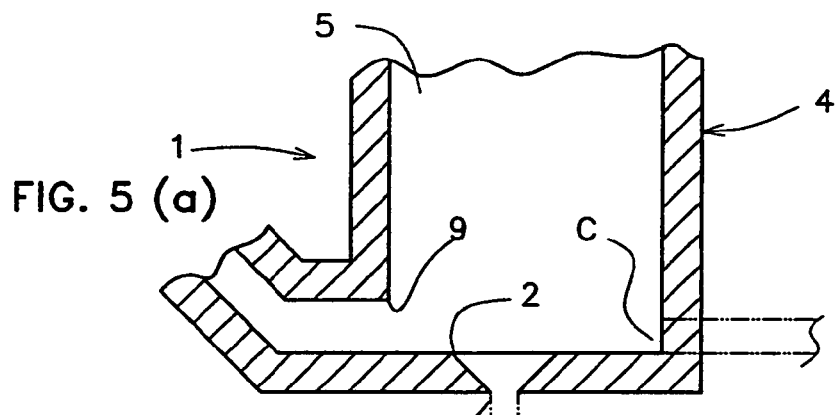
FIGS. 5(a) to 5(c) are vertical sectional views showing variations of a bottom of the all-electric glass-melting deep furnace according to the present invention.
Figure 5:
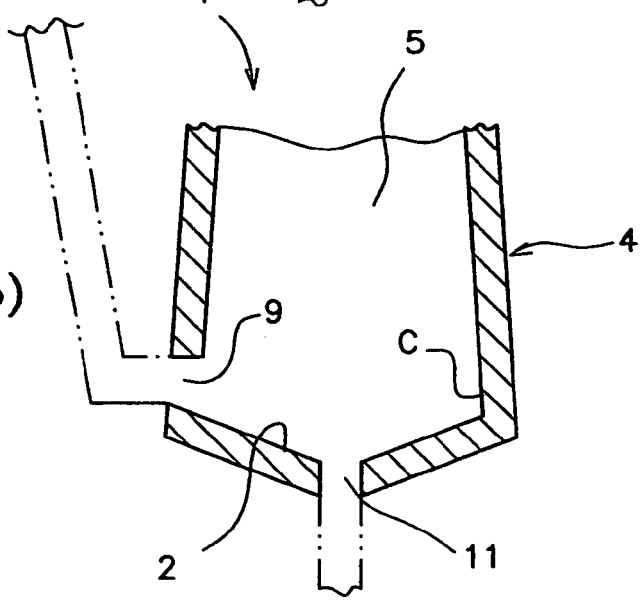
Figure 5:
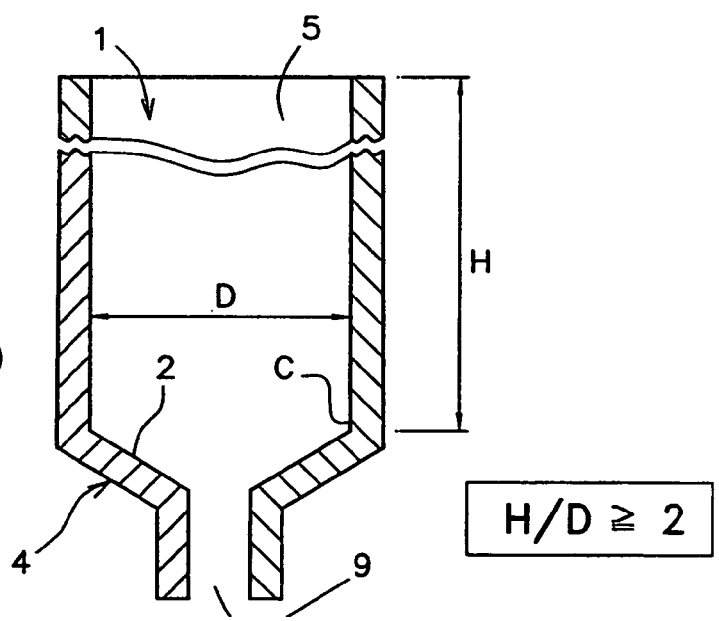

Alternatively, a drain 11 may be formed in the center of the bottom 2 of the furnace or in a suitable position, as shown in FIG. 5(a). Further, in the course of discharging the molten glass 6 from the furnace 5 through the throat portion 9, the molten glass 6 tends to remain in a corner portion C that is farthest away from the throat portion 9 in the furnace 5, as shown in FIG. 5(b). For this reason, the bottom 2 of the furnace may be cone-shaped so as to induce a smooth flow from the corner portion C to the throat portion 9.

To the bottom 2 of the furnace are provided a plurality of auxiliary electrodes 70, 71, and 72 for heating glass raw materials filled first in the furnace, as shown in FIG. 1 or FIG. 2. These auxiliary electrodes are used as the need arises. These auxiliary electrodes will be described in detail later when a method of refining and supplying glass is explained. When the refining portion is deep, the molten glass 6 in the throat portion 9 is heated with the auxiliary electrodes 70 to 72 so as to prevent the throat portion 9 from being clogged with hard glass such as color glass.

[EXAMPLE 2]

An all-electric glass-melting deep furnace 20 according to another embodiment of the present invention will be described with reference to FIG. 2. In the following description, similar parts to those of the aforementioned all-electric glass-melting deep furnace 1 are denoted by the same reference numerals and an explanation will not be given thereto.

As shown in FIG. 2, auxiliary electrodes 70, 71, and 72 are provided to the bottom 2, the side wall 4, and the throat portion 9, respectively. Although a basic construction of each auxiliary electrode is similar to that of the heating electrode 7, an output for heating molten glass may vary. In this case, the auxiliary electrodes 70, 71, and 72 preferably generate less amount of heat to heat the molten glass 6.

The method of refining and supplying glass in the all-electric glass-melting deep furnace 20 is described as follows. First, the principle of this method is described.

Figure 6:
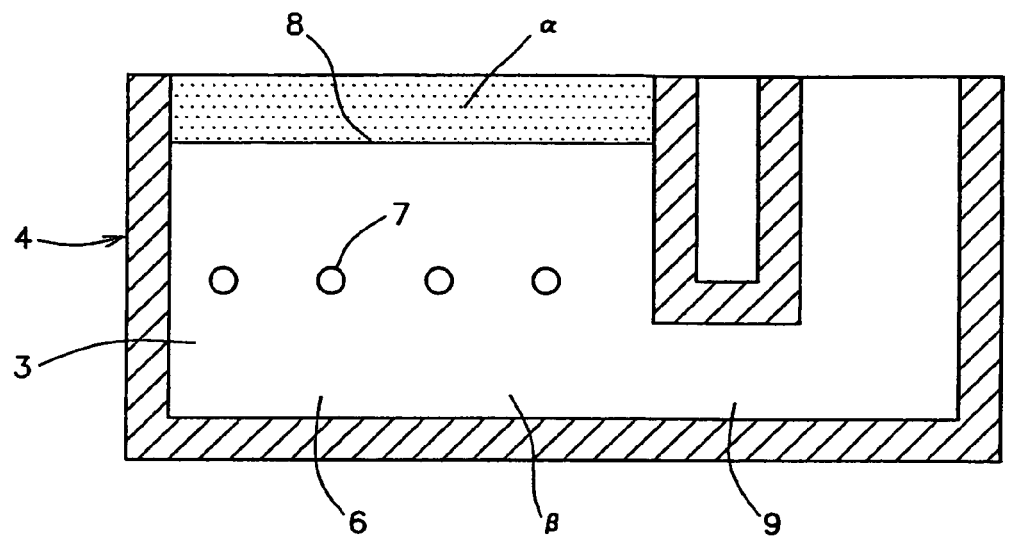
FIG. 6(a) is a vertical sectional view for showing an example of a known all-electric glass-melting furnace.
FIG. 6(b) is a vertical sectional view for conceptually showing effects of the known all-electric glass-melting furnace.
Figure 6:
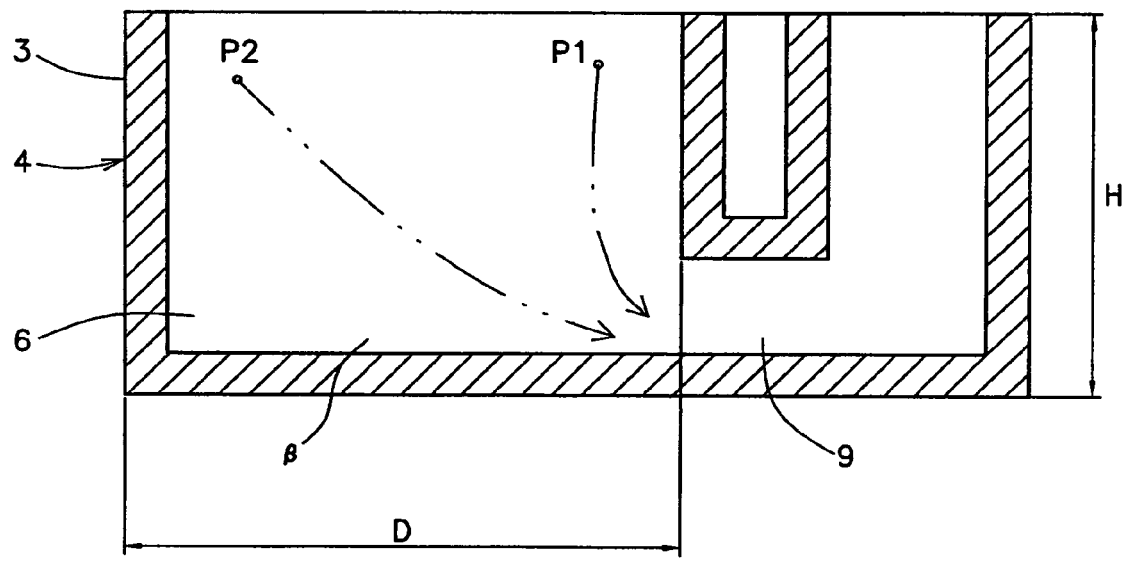

For example, a mainstream all-electric glass-melting deep furnace is about equal to the one shown in FIG. 6(a). When mass production of glass is taken into consideration, this type of furnace has a lot of problems to be solved. One of the problem is that the distance between a batch layer (a portion around a point P1) that is in contact with a throat facer (which is a left side's brick block above the throat in FIG. 6(b)) and the throat portion 9 is too short. As shown in FIG. 6(b), there is a big difference between the distance from the point P1 to the throat portion 9 and the distance from the point P2 to the throat portion 9.

In this type of the furnace, the point P1 is relatively near to the throat portion 9 and an air layer's side (outer side) of the throat facer is being cooled, so that the molten glass 6 flows from the point P1 to the throat portion 9 at the highest speed. For this reason, even in the furnace in which high-quality glass is currently produced, when a production volume increases, a flow speed of the molten glass 6 from the point P1 to the throat portion 9 and a flow speed of the molten glass 6 from the point P2 to the throat portion 9 do not increase in si proportion. Rather, the molten glass 6 around the point P1 (or the molten glass 6 near the throat facer) flows fastest down to the throat portion 9. Therefore, since the seeds around the point P1 goes fastest to the throat portion 9 with the flow of the molten glass 6, the resultant glass product tends to contain more seeds.

Therefore, as far as the length D of the furnace is larger than the height H thereof as shown in FIG. 6(b) (D>H), when the volume of the furnace is increased, the production volume does not increase in similar proportion. For example, when the size of the furnace is doubled, the volume of the furnace increases to 8 times, but the production volume only increases to about twice. Thus, the throat portion 9 is preferably placed at the bottom of the furnace.

As described above, production volume of the furnace shown in FIG. 6(a), the amount of seeds contained in the resultant glass product, and its stability may vary depending on the relationship between the length D and the height H which determine the shape of the furnace and the position of the throat portion 9. Therefore, a conventional all-electric glass-melting furnace has an advantage that it does not use fossil fuel, but it cannot dramatically increase the flow volume. In addition, such conventional all-electric glass-melting furnace has a disadvantage that the amount of seeds tends to easily fluctuate in accordance with the flow fluctuation.

Therefore, in order to achieve the effects of the present invention, the best mode of the present invention is a furnace shown in FIG. 7(a). As is clear from FIG. 7(a), the distance between the point P1 and the throat portion 9 is nearly equal to the distance between the point P2 and the throat portion 9 in this furnace. Further, in a furnace shown in FIG. 7(b), the throat portion 9 is formed in the center of the bottom of the furnace, so that the distance between the point P1 and the throat portion 9 and the distance between the point P2 and the throat portion 9 can be substantially equal.

Next, a method of refining and supplying glass in the all-electric glass-melting deep furnace 20 will be described. An English letter provided at the beginning of a paragraph is an index for showing the order of steps in which the method of the present invention is carried out.

A: The auxiliary electrodes 70 and 72 are surrounded by cutlet or powders of glass raw materials. Then, the glass raw materials are heated by a gas burner or the like until it melts. Since an electric resistance of the glass raw materials decreases at the time of melting, an electric current is passed between the electrodes 70, 71, and 72 so as to heat the molten glass until it rises to a desired temperature.

B: More cullet or powders of glass raw materials are added gradually to increase the amount of the molten glass 6 in the furnace 5. When the level of the surface 8 of the molten glass 6 becomes higher than all the heating electrodes 7, a current is passed between all the heating electrodes 7. Although all the electrodes 7 may generate the same amount of heat, they may generate a different amount of heat in the aforementioned manner. In this specification, the molten glass 6 may be hereinafter heated by passing a current only between the heating electrodes 7 or by passing a current not only between the heating electrodes 7 but also between the auxiliary electrodes 70.

C: The temperature of the molten glass 6 is raised to a predetermined target value. In this case, the molten glass 6 obtained in the aforementioned step B is heated by passing a current not only between the heating electrodes 7 but also between the auxiliary electrodes 71, or by passing a current only between the heating electrodes 7.

D: further glass raw materials are poured into the furnace 5 to raise the level of the surface 8 of the molten glass 6. In the drawing, the level of the surface 8 is twice or more than twice as high as the lowest level of heating electrodes 7. However, only h2 may be set to higher. In this step, it is preferable to pass a current between all the heating electrodes 7 and auxiliary electrodes 70, 71, and 72. Then, by putting more amount of glass raw materials into the furnace than that of the glass raw materials melted by the heating electrodes 7 and the auxiliary electrodes 70, 71, and 72, a batch layer α is foamed.

The thickness of the aforementioned batch layer α is determined according to the production volume of the molten glass 6 and the inside diameter of the furnace. For example, an amount of energy to be applied and an amount of cullet or powders of glass raw materials to be added, or the production volume of molten glass 6, are so adjusted that the aforementioned batch layer α is thick enough not to emit heat. Preferably, the thickness of the batch layer α is 30 cm or more, and more preferably 50 to 70 cm or more. When the thickness of the batch layer α is 30 cm or more, the temperature of the molten glass 6 is excellently kept constant, so that heat efficiency of the all-electric glass-melting deep furnace 20 is dramatically increased.

E; While the molten glass 6 is being heated by all the heating electrodes 7, the molten glass 6 is convected above the heating electrodes 7. This step E is lasted for an appropriate period of time.

In this case, if the amount of heat generated by the heating electrodes 7 is set to the aforementioned ratio, heating temperature of the respective heating electrodes 7 can be more controlled than the case where the molten glass 6 is heated by only one level of heating electrodes 7. For this reason, a significant increase in temperature does not occur near the heating electrodes 7. In addition, a distance (h1–h2)

between the lowest level of heating electrodes 7 and the surface 8 of the molten glass 6 is significantly longer in the furnace of the present invention than in a conventional open-hearth furnace, a rising speed of the molten glass 6 can be slowed down and the high-temperature molten glass 6 can be prevented from gathering just above the heating electrodes 7.

Furthermore, the effects that the temperature of the surface 8 becomes uniform and that the batch layer α is uniformly melted are enhanced. In addition, when the distance (h1–h2) between the lowest level of heating electrodes 7 and the surface 8 of the molten glass 6 is significantly long, the temperature of the surface 8 of the molten glass 6 can be suitably maintained by continuously heating the molten glass 6 in the refining layer β by the auxiliary electrodes 71, although the temperature of the molten glass 6 is decreased in the course of moving downward in the refining layer β.

When the molten glass in the refining layer β is heated by the auxiliary electrodes 70, the molten glass 6 tends to rise to some extent near the auxiliary electrodes 70. However, the molten glass 6 has a high tendency to move toward the throat portion 9 as a whole, so that a convection does not occur.

F: The molten glass 6 in the refining layer β is sucked through the throat portion 9 by a suction apparatus, and then fed to a machine for making a plate glass and the like.

G: While glass raw materials correspond to the volume of the molten glass 6 discharged from the throat portion 9 formed in the bottom 2 of the furnace is additionally poured into the furnace 5, a total amount of heat generated by all the heating electrodes 7 and auxiliary electrodes 70 shown in the drawings or a total amount of heat generated only by all the heating electrodes 7 shown in the drawings is suitably adjusted so as to make the temperature decrease from top to bottom of the furnace 5. By repeating the aforementioned step D, the refining layer β can be constantly generated and high-quality molten glass 6 can be successively produced in quantity.

Further, auxiliary electrodes similar to the auxiliary electrodes 72 shown in FIG. 1 may be provided to the throat portion 9 of the all-electric glass-melting deep furnace 20 shown in FIG. 2 as well. A dimension line in the drawings is an index for showing a dimensional eagle of the furnace 5. Therefore, it should be understood that a dimensional line in the drawings does not limit portions to be actually measured in the furnace according to the present invention.

The disclosure of Japanese Patent Application No. 2003-97624 filed Apr. 1, 2003 including specification, drawings and claims is incorporated herein by reference in its entirety.

There have thus been shown and described a novel all-electric glass-melting deep furnace and a novel method of refining and supplying glass which fulfill all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An all-electric glass-melting deep furnace comprising:
   a bottom; and
   a side wall constructed by piling up fireproof bricks on a perimeter of the bottom, said side wall extending upwardly from the perimeter of the bottom, inclining inwardly, thereby being substantially trapezoidal in shape as viewed from the side, and thereby defining an inside lateral dimension of the bottom;
   wherein heating electrodes jut from an inner surface of the side wall and pass a current through molten glass filled inside the side wall, a height of the side wall being at least twice that of the inside lateral dimension of the bottom, and distances from the heating electrodes to the bottom of the furnace being at least equal to the inside lateral dimension of the bottom.

2. The all-electric glass-melting deep furnace according to claim 1, wherein said side wall extends upwardly from the perimeter of the bottom and is rectangular in shape as viewed from the side.

3. The all-electric glass-melting deep furnace according to claim 1, wherein auxiliary electrodes for heating the molten glass by generating smaller amount of heat than said heating electrodes are provided below the heating electrodes, respectively.

4. The all-electric glass-melting deep furnace according to claim 1, wherein said heating electrodes are placed at different levels from the bottom of the furnace, respectively.

5. The all-electric glass-melting deep furnace according to claim 1, wherein a feeder for discharging the molten glass from the furnace is provided at a lower position than a surface level of the molten glass, depending on a depth of the furnace.

6. The all-electric glass-melting deep furnace according to claim 5, wherein said molten glass is discharged from said feeder through a throat portion formed in the center of the bottom of the furnace.

7. The all-electric glass-melting deep furnace according to claim 1, wherein auxiliary electrodes are provided for heating the molten glass by generating a smaller amount of heat than said heating electrodes.

8. The all-electric glass-melting deep furnace according to claim 1, wherein said heating electrodes are placed at different levels from the bottom of the furnace.

9. The all-electric glass-melting deep furnace according to claim 5, wherein said feeder for discharging the molten glass from the bottom of the furnace is provided at a lower position than a surface level of the molten glass, depending on a depth of the furnace.

10. The all-electric glass-melting deep furnace according to claim 9, wherein said molten glass is discharged from said feeder through a throat portion formed in the center of the bottom of the furnace.

\* \* \* \* \*